July 14, 1959     E. S. STODDARD     2,894,845
METHODS OF PRESERVING FRESH FOODS
Filed April 18, 1955     4 Sheets-Sheet 1

INVENTOR.
Edgar S. Stoddard
BY Smith, Olsen, Baird
& Gulbrandsen, Attys.

July 14, 1959 E. S. STODDARD 2,894,845
METHODS OF PRESERVING FRESH FOODS
Filed April 18, 1955 4 Sheets-Sheet 2
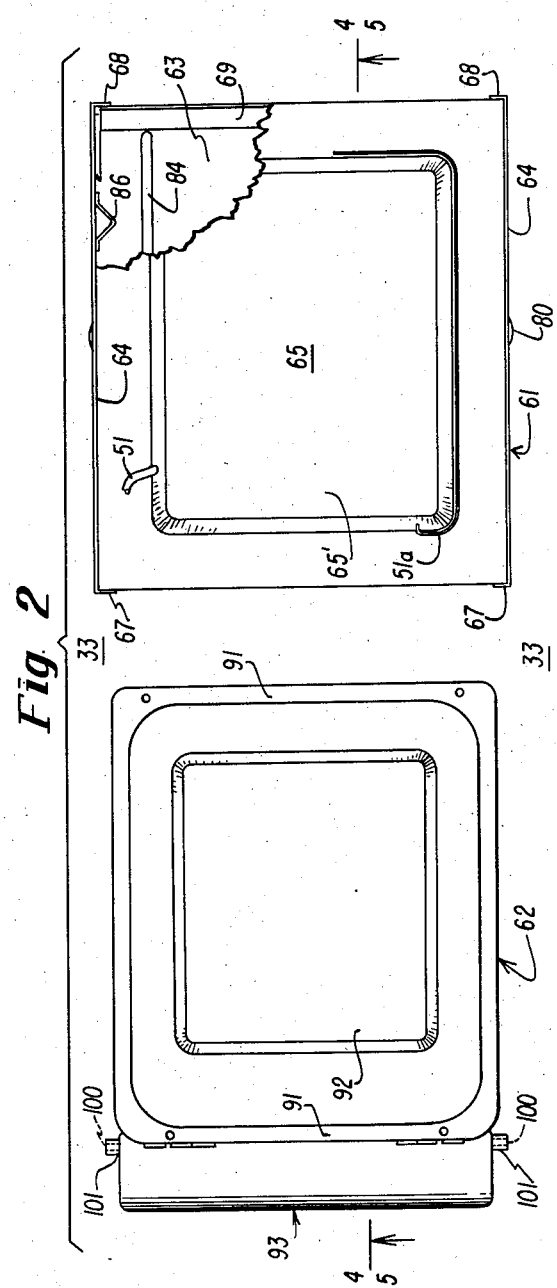
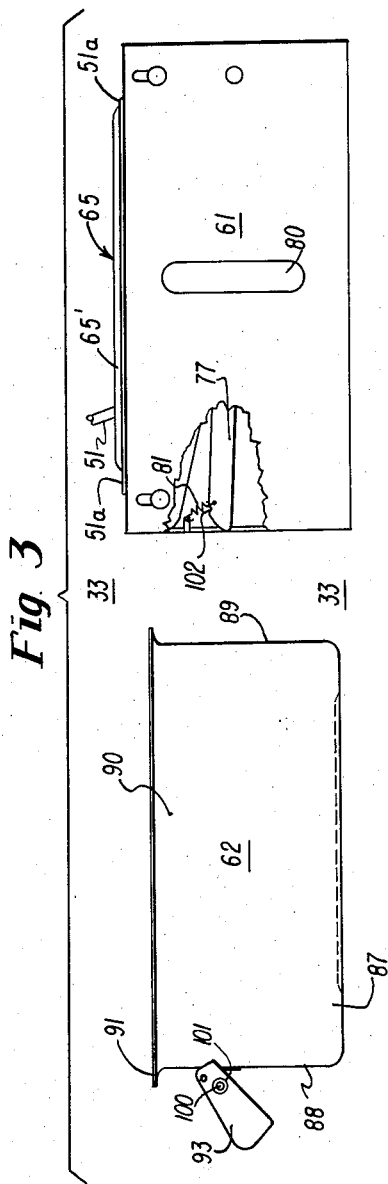
INVENTOR.
Edgar S Stoddard
BY Smith, Olsen, Baird
& Gulbrandsen,
Attys.

July 14, 1959     E. S. STODDARD     2,894,845
METHODS OF PRESERVING FRESH FOODS
Filed April 18, 1955     4 Sheets-Sheet 3
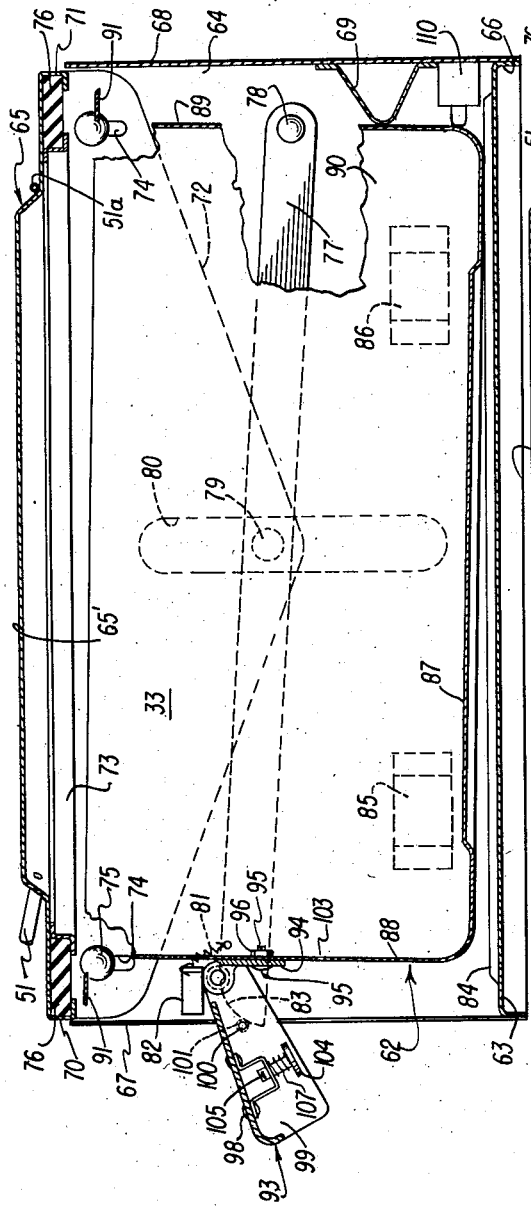
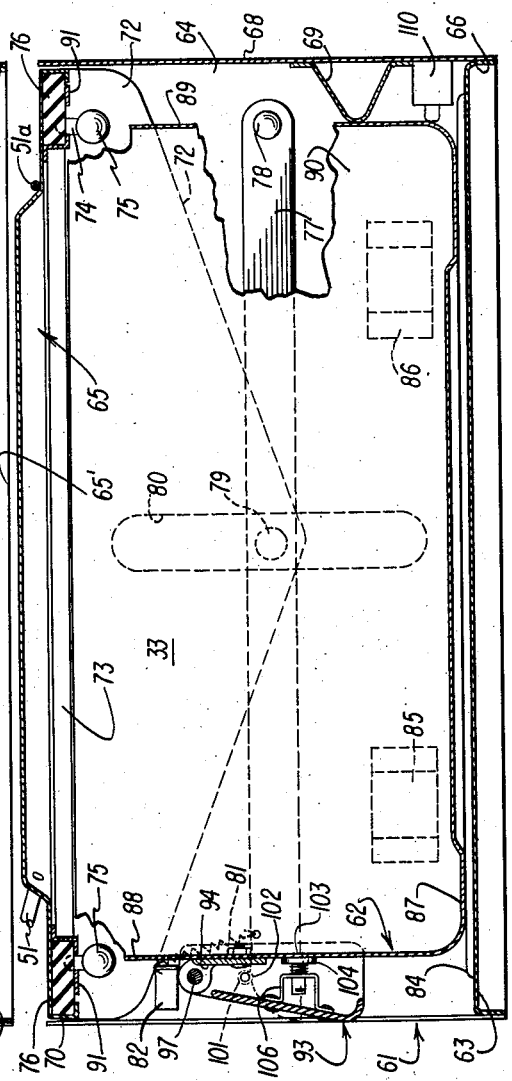
INVENTOR.
Edgar S. Stoddard
BY
Attys.

July 14, 1959   E. S. STODDARD   2,894,845
METHODS OF PRESERVING FRESH FOODS
Filed April 18, 1955   4 Sheets-Sheet 4
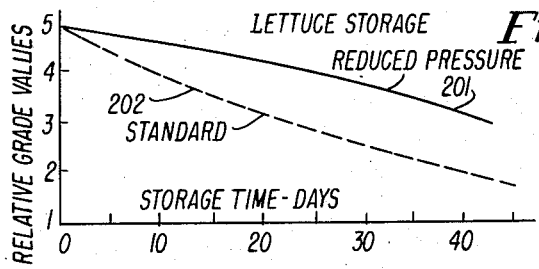
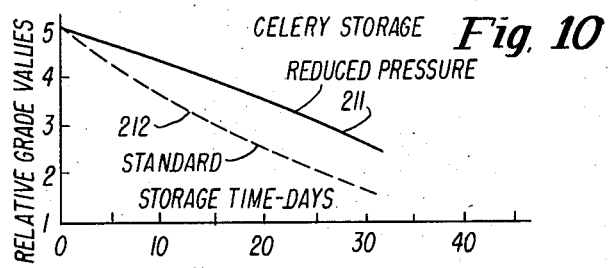
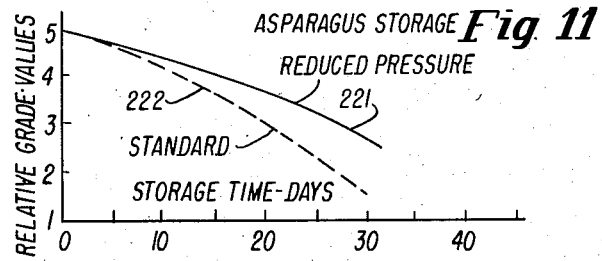
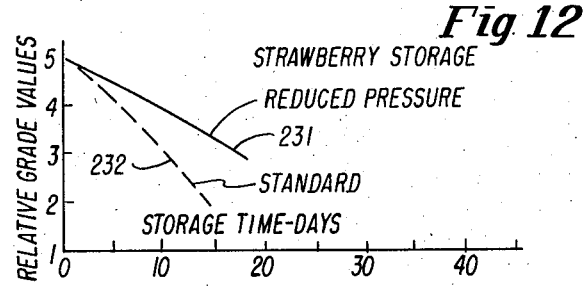
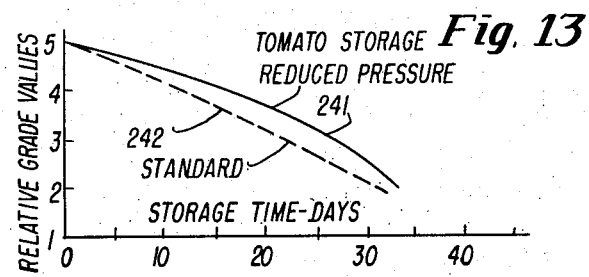
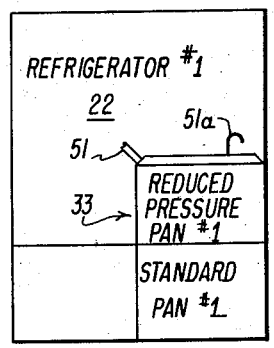
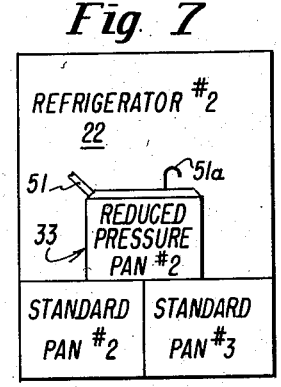
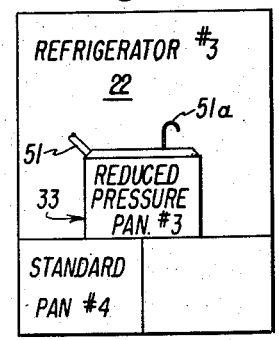
INVENTOR.
Edgar S Stoddard
BY Smith, Olsen, Baird & Gulbrandsen, Attys.

United States Patent Office 2,894,845
Patented July 14, 1959

2,894,845

METHODS OF PRESERVING FRESH FOODS

Edgar S. Stoddard, Berwyn, Ill., assignor to General Electric Company, a corporation of New York Application April 18, 1955, Serial No. 503,901

4 Claims. (Cl. 99—193)

The present invention relates to methods of preserving fresh foods, particularly vegetables, fruits, berries, and the like.

Heretofore it has been proposed that the satisfactory storage life of fresh foods of the class mentioned might be substantially extended by subjecting the fresh food to the simultaneous effects of refrigeration and low pressure. However, these suggestions have always proceeded upon the general basis that in order to retard the growth of bacteria responsible for decay, of saprophytic fungi responsible for mold, and of other agents responsible for other aspects of deterioration of such food, it was necessary to subject the fresh food to a very low pressure (a very substantial vacuum); whereby the required pumping apparatus was not only very expensive to manufacture, but the very low pressure brought about the break-down of cell structure in the fresh food and accelerated very materially drying-out thereof, so that any extension of the satisfactory storage life of the fresh food with respect to one aspect of deterioration was offset by a corresponding contraction of the satisfactory storage life of the fresh food with respect to another aspect of deterioration.

Accordingly, it is a general object of the present invention to provide an improved method of preserving fresh foods of the class including vegetables, fruits, berries, and the like, that involves, in conjunction with refrigeration, the utilization of only moderately low pressure; whereby the pumping apparatus required is only of very low capacity.

Another object of the invention is to provide a method of preserving fresh foods of the class noted, that may be carried out in a household refrigerator and that is entirely automatic as far as any attention on the part of the housewife is concerned.

A further object of the invention is to provide an improved method of preserving fresh foods that involves a pan adapted for use in storage of such foods, wherein the pan is readily removably supported by cooperating structure arranged in the food storage compartment of a household refrigerator, and incorporating simple facility for continuously maintaining the pressure in the supported pan within the approximate range 0.88 to 0.95 atmosphere.

Further features of the invention pertain to the particular arrangement of the steps of the method and of the elements of the apparatus, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 2 is an enlarged exploded plan view, partly broken away, of the two principal components of the pressure-controlled receptacle shown in Fig. 1;

Fig. 3 is a corresponding enlarged exploded side elevational view, partly broken away, of the two principal components of the pressure-controlled receptacle;

Fig. 4 is a greatly enlarged vertical sectional view of the receptacle, taken in the direction of the arrows along the line 4—4 in Fig. 2, illustrating the element thereof in open position;

Fig. 5 is another greatly enlarged vertical sectional view, identical to that of Fig. 4, of the receptacle, illustrating the elements thereof in closed position;

Figure 1:
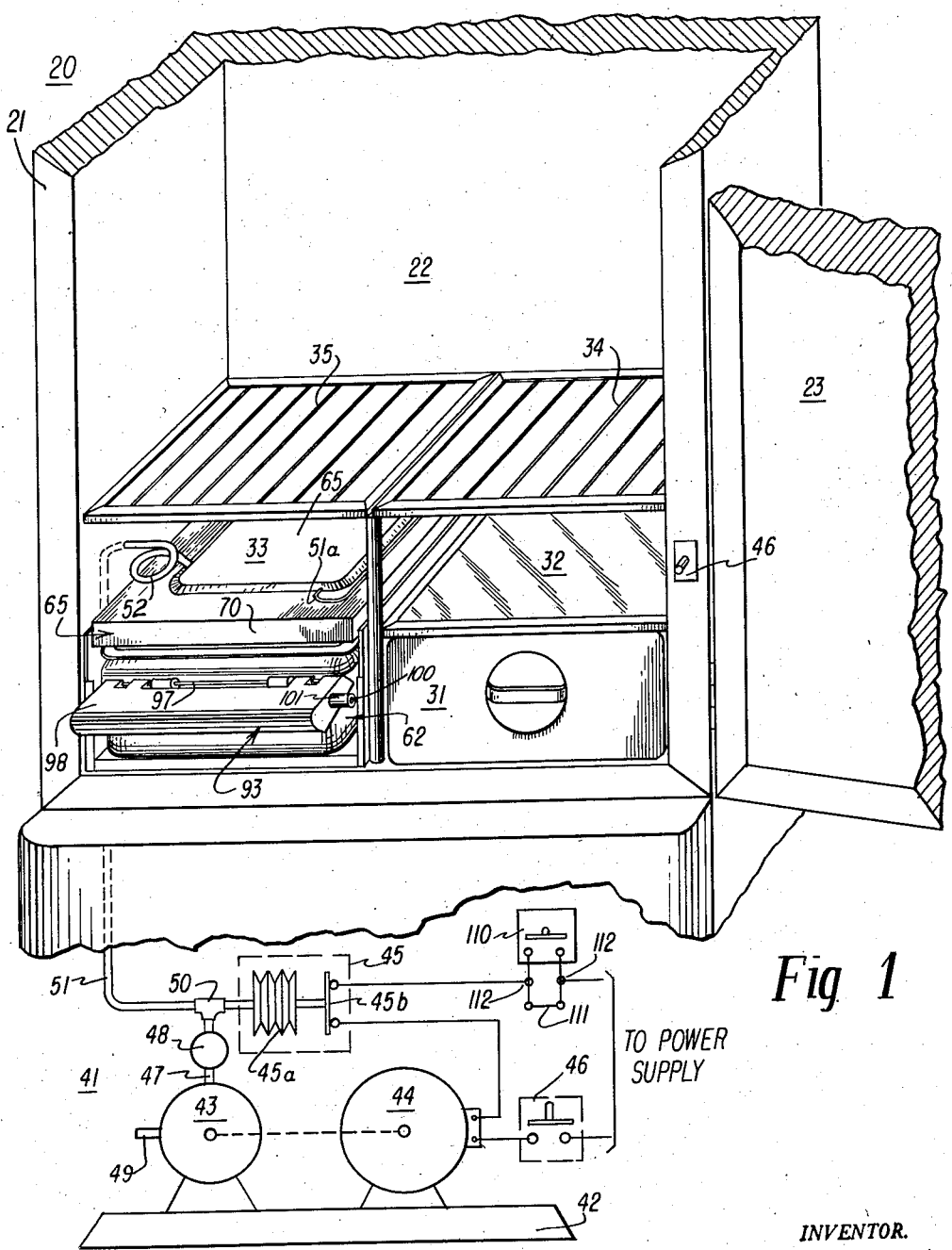
Figure 1 is a combination fragmentary front perspective view of a household refrigerator provided with a food storage compartment carrying in the bottom thereof a pressure-controlled receptacle, and a diagrammatic view of associated pumping apparatus, embodying the present invention, the front door of the refrigerator being illustrated in its fully open position.

Figs. 6 to 8, inclusive, are diagrammatic illustrations of three corresponding arrangements of test receptacles that were employed in three corresponding refrigerators involved in the test of the method and the apparatus; and Figs. 9 to 13, inclusive, are five sets of curves comparing the results of the test mentioned as applied to five corresponding species of fresh food.

Referring now to Fig. 1, there is illustrated the lower portion of a conventional household refrigerator 20 comprising a portion of the apparatus in which the method of the present invention is carried out; which refrigerator 20 comprises a cabinet 21 defining a food storage compartment 22, as well as a refrigerating machine, not shown, that is adapted to refrigerate the food storage compartment 22 in the usual manner. The cabinet 21 is provided with a front door 23, illustrated in its fully open position; and within the bottom of the storage compartment 22, on the right-hand side, there is removably supported a conventional food storage receptacle 31 provided with a glass cover 32 disposed thereabove and independently supported within the storage compartment 22. Also within the bottom of the storage compartment 22, on the left-hand side, there is arranged a pressure-controlled receptacle 33, of a construction more fully described hereinafter; arranged respectively above the glass cover 32 and the pressure-controlled receptacle 33 are a pair of half-shelves 34 and 35 removably supported within the storage compartment 22; and arranged above the half-shelves 34 and 35 are a number of full shelves, not shown, removably supported within the storage compartment 22. In the arrangement, the food storage receptacle 31 of conventional construction includes a removable pan-like drawer having the usual bottom, front, rear and opposed side walls defining an open top. The glass cover 32 is spaced a short distance above the open top of the associated pan-like drawer so as to define a top opening thereinto accommodating the limited circulation of a gentle current of cool air through the interior of the receptacle 31.

The half-shelves 34 and 35, as well as the full shelves, not shown, are of open wirework construction; whereby the shelf arrangement accommodates circulation of convection currents of air through the storage compartment 22. The refrigerating machine previously mentioned that is associated with the cabinet 21 includes an evaporator, not shown, that is operatively associated with the storage compartment 22; and the arrangement comprises thermal-controlled facility for maintaining a temperature within the storage compartment 22, falling in the general range 35° F. to 50° F., and preferably within the somewhat more limited range 37° F. to 46° F.

Before proceeding with a detailed description of the pressure-controlled receptacle 33, it is first mentioned that the refrigerator cabinet 21 further comprises a machinery compartment, not shown, disposed below the storage compartment 22, in which at least the motor-compressor unit of the refrigerating machine previously mentioned is arranged. Also, within this machinery compartment, there is arranged facility for evacuating the pressure-controlled receptacle 33; which facility comprises the unit 41 diagrammatically illustrated. The unit 41 comprises a base 42 carrying a suction pump 43 of any suitable type, an electric drive motor 44, a pressure-controlled switch 45 and a door switch 46 of the pushbutton type. More particularly, the suction pump 43 is provided with an intake conduit 47 communicating with an associated check valve 48 and a discharge conduit 49 communicating with the atmosphere. In turn, the check valve 48 is connected to the stem of a T-fixture 50. One arm of the fixture 50 communicates with the interior of the pressure-controlled receptacle 33 via a suction conduit 51 including a coil 52 that accommodates relative movement of the cover element of the receptacle 33 with respect to the base element thereof, as explained more fully hereinafter; while the other arm of the fixture 50 communicates with the pressure-controlled switch 45.

The arrangement further comprises a source of power supply that may be of 110-volts, single-phase, 60 cycle; and the door switch 46 may be arranged between the inner and outer walls of the cabinet 21 in cooperating relation with the front door 23. As diagrammatically illustrated, the pressure-controlled switch 45 includes a sealed bellows 45a communicating with the fixture 50 and an associated contact bridging member 45b. The elements of the electric circuit are arranged in series relation, whereby closure of the front door 23 effects closure of the door switch 46 and an increased pressure in the suction conduit 51 governs the bellows 45a to effect closure of the contact bridging member 45b so as to complete the circuit for energizing the electric motor 44. Also it follows, that opening of the front door 23 effects operation of the door switch 46 into its open position to interrupt the circuit for energizing the electric motor 44; and likewise, when the pressure within the suction conduit 51 is reduced to a predetermined value, the bellows 45a is governed to effect opening of the contact bridging member 45b to interrupt the circuit for energizing the electric motor 44. Of course, it will be understood that the operation of the pump 43 by the electric motor 44 brings about a reduction of the pressure within the suction conduit 51 and consequently within the pressure-controlled receptacle 33, as explained more fully hereinafter; while the check valve 48 prevents the leak of air through the pump 43 into the suction conduit 51, when operation of the pump is arrested.

As illustrated in Figs. 2 and 3, the pressure-controlled receptacle 33 essentially comprises a hollow stationary housing or supporting base element 61 and a removable pan or drawer element 62, the housing element 61 being arranged within the bottom left-hand portion of the storage compartment 22, as previously noted, and the pan 62 being removably received within the housing 61 through the open front thereof. Referring now to Figs. 2 to 5, inclusive, the housing 61 comprises a bottom wall 63 and opposed upstanding side walls 64, as well as a movable cover 65. The bottom wall 63 is provided with a downwardly turned surrounding marginal flange 66; the side portions of which are respectively secured to the lower portions of the side walls 64. Also, the front and rear ends of the side walls 64 are respectively provided with inturned flanges 67 and 68, the rear flanges 68 being connected together adjacent to the lower portions thereof by a laterally extending tie element 69, that also serves as a bumper or positioner for the pan 62. As previously mentioned, the cover 65 is movable with respect to the side walls 64 and is disposed in opposed relation with respect to the bottom wall 63; whereby the front of the housing 61 is open in order to accommodate placement and removal of the pan 62, as previously noted. More particularly, the cover 65 is provided with a downwardly turned surrounding marginal flange including short laterally extending front and rear sections 70 and 71 respectively, and long longitudinally side sections 72 arranged within and closely adjacent to the respective side walls 64. Also, the central portion of the cover 65 is upwardly dished or crowned, as indicated at 65'; and the inner end of the suction conduit 51 projects through an opening provided in the crown 65' and is suitably secured in place providing an airtight junction therebetween.

More particularly, the depending side sections 72 carried by the cover 65 constitute guide aprons that are slidably secured to the respective side wall 64 by pin and slot connections, each of the guide aprons 72 being provided with upstanding slots 74 adjacent to the respective front and rear ends thereof that cooperate with inwardly projecting pins or rivets 75 respectively carried adjacent to the respective front and rear ends of the associated side wall 64; whereby the cover 65 is mounted for movement toward and away from the bottom wall 63 in the general manner of a piston with respect to its associated cylinder. Also arranged within the cover 65 and surrounding the crown 73 is a substantially rectangular sealing gasket 76 formed of compressible material, the gasket 76 being suitably secured to the adjacent surface of the cover 65 and being arranged to cooperate with the open top of the associated pan 62, as explained more fully hereinafter. For example, the sealing gasket 76 may be formed of soft rubber and is frictionally secured in place in a cooperating rectangular channel, defined between the downwardly turned marginal flange of the cover 65 and an inwardly spaced frame-like element 73 secured to the under surface of the top wall of the cover 65.

The central lower portions of the pair of guide aprons 72 are respectively pivotally mounted upon the intermediate portions of a pair of opposed levers 77, that are respectively carried by the adjacent side walls 64. More particularly, the rear end of each of the levers 77 is pivoted upon the adjacent side wall 64 by an arrangement including a pivot pin 78; and the intermediate portion of each of the levers 77 is pivoted to the adjacent lower central portion of the associated guide apron 72 by an arrangement including a pivot pin 79 of rivet-like form. In the arrangement, each of the levers 77 is disposed between the adjacent side wall 64 and the adjacent guide apron 72; whereby each of the side walls 64 is provided with an upstanding and outwardly directed bead 80, accommodating the head of the rivet 79, so as to prevent scraping or binding thereof upon the associated side wall 64. The outer ends of the levers 77 project forwardly within the housing 61 and terminate adjacent to the front thereof; each of the levers 77 being biased upwardly by an arrangement including a coil spring 81 extending between the front end thereof and an associated fixture 82 disposed thereabove and secured to the front of the associated side wall 64. Thus the arrangement of the coil springs 81 bias the two levers 77 upwardly effecting movement of the cover 65 into its normally open position, as illustrated in Fig. 4.

Also, the front end of each of the levers 77 is provided with a rounded cam surface 83, that is employed in a manner more fully explained hereinafter to bring about movement of the lever 77 downwardly; whereby the two levers 77 moving downwardly effect downward movement of the cover 65 into its closed position, as illustrated in Fig. 5. Also, the bottom wall 63 carries a pair of laterally spaced-apart and longitudinally extending guide beads or rails 84 that support the bottom wall of the pan 62; and each of the side walls 64 carries a pair of inwardly projecting front and rear guide members 85 and 86, respectively, that cooperate with the associated side wall of the pan 62 in order to insure proper location thereof within the housing 61.

Turning now to the pan 62, it essentially comprises a substantially rectangular structure including a bottom wall 87, front and rear walls 88 and 89 and opposed side walls 90 and defining an open top that is surrounded by an outwardly directed marginal flange 91. Also the central portion of the bottom wall 87 is upwardly dished, as indicated at 92. The pan 62 is normally formed or drawn from mild steel and is usually provided with a porcelain enamel coating and may have the approximate dimensions: 11 5/8" x 11 3/8" x 5 5/8"; the pan 62 having a depth between the front and rear walls thereof that is slightly greater than the width between the opposed side walls thereof.

In view of the foregoing, it will be understood that when the cover 65 occupies its open or raised position with respect to the side walls 64, as shown in Fig. 4, the pan 62 may be readily inserted and removed with respect to the open front of the housing 61. Thereafter, the cover 65 may be operated into its closed or lower position, as shown in Fig. 5; whereby the sealing gasket 76 is brought into sealing engagement with the marginal flange 91 of the pan 62, thereby sealing the cover 65 to the pan 62 so that the pressure within the pan 62 may be appropriately reduced via the suction conduit 51, as explained more fully hereinafter. At this time, when the pan 62 is arranged in its supported position within the housing 61, as illustrated in Fig. 5, it is located longitudinally with respect to the front and rear of the housing 61 by the cooperation between the rear wall 89 and the bumper 69, and it is also located laterally with respect to the sides of the housing 61 by the cooperation between the pairs of front and rear guide members 85 and 86, respectively, and the side walls 90. Further, at this time, the bottom wall 87 is arranged in supported position upon the guide rails 84. Thus, the position of the pan 62 is precisely located within the housing 61, when the cover 65 occupies its closed position, as shown in Fig. 5.

Further considering the structure of the pan 62, it is noted that the front wall 88 carries a pivotally mounted handle member 93 that is movable between an open position, as illustrated in Fig. 4, and a closed position, as illustrated in Fig. 5. More particularly, the handle member 93 comprises one element of composite hinge mechanism, the other element 94 thereof being secured to the front surface of the front wall 88 by a pair of laterally spaced-apart screws 95 extending through appropriate holes provided through the front wall 88 and carrying cooperating nuts 96. Also grommets, formed of rubber, or the like, are arranged in the holes mentioned in surrounding relation with respect to the shanks of the screws 95 so as to prevent leakage of air therethrough. Further, the composite hinge mechanism mentioned comprises a pintle 97 that is arranged through aligned holes provided in cooperating knuckles respectively carried adjacent to the upper portions of the hinge elements 93 and 94. Also the handle element 93 is of generally hollow configuration extending laterally across the outside of the front wall 88, is located above the plane of the bottom wall 87 and below the plane of the marginal flange 91, and includes a front wall portion 98 and a pair of opposed inwardly turned side wall portions 99. The side wall portions 99 of the handle member 93 are disposed respectively adjacent to the outer ends of the levers 77 and inwardly thereof; and respectively carry a pair of laterally projecting pins 100, that, in turn, respectively carry a pair of substantially sleeve-like rollers 101, that respectively cooperate with the cam surfaces 83 respectively provided on the extreme outer ends of the levers 77.

In view of the foregoing, it will be understood that when the pan 62 occupies its supported position within the housing 61 and the handle member 93 occupies its open position, as illustrated in Fig. 4, the rollers 101 are arranged forwardly of the respective cam surfaces 83 respectively provided on the extreme front ends of the levers 77 and in cooperating relation therewith.

When the handle member 93 is moved from its open position, as shown in Fig. 4, into its closed position, as shown in Fig. 5, the rollers 101 ride downwardly upon the cooperating cam surfaces 83 provided on the extreme front ends of the respective levers 77, forcing the levers 77 downwardly; whereby the cover 65 is moved from its open position of Fig. 4 into its closed position of Fig. 5. Also, it is noted that in each of the levers 77, just behind the cam surface 83 provided on the extreme front end thereof, a depression 102 is formed in the top surface thereof in order to receive the associated roller 101, when the handle member 93 occupies its closed position, illustrated in Fig. 5, thereby to render the closed position of the handle member 93 a stable position thereof, so as, in effect, to latch the handle member 93 in its closed position.

Further, the pan 62 comprises an arrangement for venting the interior thereof and including valve mechanism in the form of a small vent hole 103 or port provided in the central portion of the front wall 88 and a cooperating valve element or plunger 104 carried by the handle member 93. More particularly, the valve element 104 may comprise a disk formed of rubber, or the like, carried on the outer end of a plunger 105 that is mounted in an opening provided in the central portion of a bracket 106 that is secured to the rear surface of the front wall portion 98 of the handle member 93, a coil spring 107 being arranged in surrounding relation with the plunger 105 between the valve element 104 and the central portion of the bracket 106. The coil spring 107 is of the compression type, whereby the valve element 104 is urged away from the bracket 106 and toward the associated vent port 103. Thus, when the handle member 93 occupies its open position, as illustrated in Fig. 4, the valve element 104 is moved into an open position with respect to the vent port 103; and when the handle member 93 occupies its closed position, as illustrated in Fig. 5, the valve element 104 is moved into a closed position with respect to the vent port 103.

Considering now the overall operation of the pressure-controlled receptacle 33, when the front door 23 is moved into its open position, the door switch 46 is operated into its open position, thereby insuring that operation of the electric motor 44 is arrested. At this time, the pan 62 may be removed from the associated housing 61, and it may be assumed that a reduced pressure prevails within the pan 62, the cover 65 occupying its closed position with respect to the marginal flange 91 and the valve element 104 occupying its closed position with respect to the vent port 103. More particularly, the housewife seizes the handle member 93 and pulls forwardly thereupon operating it from its closed position, shown in Fig. 5, into its open position, shown in Fig. 4; whereby the valve element 104 is moved to open the vent port 103 so as to accommodate the passage of atmospheric air through the vent port 103 into the interior of the pan 62. Also movement of the handle member 93 into its open position causes the pair of rollers 101 to disengage the depressions 102 respectively provided in the extreme front ends of the levers 77; whereby the levers 77 are returned upwardly moving the cover 65 from its closed position of Fig. 5 into its open position of Fig. 4; this opening movement of the cover 65 being possible at this time by virtue of the relief of the subatmospheric pressure within the pan 62, as a consequence of the opening of the vent port 103. Accordingly, the housewife, upon further forward pulling upon the handle member 93, may move the pan 62 sufficiently forwardly with respect to the housing 61 to render the interior of the pan 62 accessible for the placement and removal of foods with respect thereto. Of course, the pan 62 may also be moved further forwardly and entirely from the housing 61 and completely out of the front opening into the storage compartment 22.

Subsequently, the pan 62 may be returned through the front opening into the storage compartment 22 and back into the housing 61 with the door 23 in its open position; and when the pan 62 is thus returned into its proper supported position within the housing 61, the handle member 93 may be operated from its open position of Fig. 4 into its closed position of Fig. 5; whereby the levers 77 are operated to effect movement of the cover 65 from its open position into its closed position and to effect movement of the valve element 104 from its open position into its closed position with respect to the vent port 103. At this time, the door 23 is returned back into its closed position effecting closure of the door switch 46. Of course, atmospheric pressure prevails at this time in the interior of the pan 62; whereby atmospheric pressure prevails in the suction conduit 51, so that the pressure-controlled switch 45 occupies its closed position. More particularly, the bellows 45a of the pressure-controlled switch 45 is expanded closing the contact bridging member 45b; whereby the circuit for energizing the winding of the electric motor 44 is completed. Operation of the electric motor 44 effects operation of the suction pump 43 so that air is drawn from the suction conduit 51 and pumped to the exterior via the discharge conduit 49. Since the suction conduit 51 communicates via the coil 52 and through the cover 65 with the interior of the pan 62, air is withdrawn from the interior thereof effecting a reduction of the pressure therein. As the pressure within the suction conduit 51 is reduced, the bellows 45a is contracted so that ultimately the contact bridging member 45b is moved into its open position in order to interrupt the circuit for operating the electric motor 44. In the arrangement, the pressure-controlled switch 45 is so adjusted that it is operated to effect closure of the contact bridging member 45b, when the pressure in the suction conduit 51 rises to a pressure of 0.95 atmosphere, and so adjusted that it is operated to effect opening of the contact bridging member 45b, when the pressure in the suction conduit 51 falls to a pressure of 0.88 atmosphere. Accordingly, the pressure-controlled switch 45 is arranged to govern the operation of the unit 41 so as to maintain a pressure within the pressure-controlled receptacle 33 within the approximate range 0.88 to 0.95 atmosphere.

Also, it will be understood, that even though the cover 65 is continuously maintained in its closed position with respect to the pan 62, the pressure within the pan 62, after a time interval, rises to 0.95 atmosphere, due to the liberation of gases and vapors by the foods contained in the pan 62, leakage at the gasket 76, etc.; whereby the pressure-controlled switch 45 is governed in the manner explained above. Thus, the pressure in the pan 62 is cycled from end to end of the pressure range mentioned, over a time interval, even though the cover 65 is maintained in its closed position with respect to the pan 62.

In fact, in the testing of the pressure-controlled receptacle 33, it has been established that there are definite advantages in constructing the receptacle 33 so that it is cycled from end to end of the pressure range mentioned, about three or four times per hour in the normal operation thereof with the cover 65 continuously in its closed position with respect to the pan 62. In order to insure this mode of operation, a capillary tube 51a is secured in place in an opening provided in the cover 65 and communicating between the interior of the pan 62 and the interior of the storage compartment 22, thereby to provide a controlled air-leak therebetween. Specifically, the capillary tube 51a effects an exceedingly low rate of leakage of cool air from the storage compartment 22 into the receptacle 33, so as to effect cycling of the pressure therein from end to end of the pressure range 0.88–0.95 atmosphere about three or four times per hour with the cover 65 continuously in its closed and sealed position with respect to the top of the pan 62. In the arrangement, the suction pump 43 has a capacity to effect the reduction of the pressure in the receptacle 33 in a very short time interval of about one minute, so that the overall cycle requires a time interval in the general range 15 to 20 minutes.

In this connection, it is pointed out that cycling of the pressure in the receptacle 33 too frequently is objectionable, as it effects too much drying-out of the stored foods; whereby the size of the capillary tube 51a should be selected with reference to the volume of the receptacle 33 and to the capacity of the suction pump 43 so as to obtain the desired balance and resulting overall cycling, as explained above.

As best illustrated in Figs. 1, 4 and 5, a modification in the electric circuit is contemplated, that includes a pan switch 110 of the pushbutton type carried by the rear wall 68 of the housing 61 and disposed below the bumper 69 and cooperating with the rear wall 89 of the pan 62. Specifically the pan switch 110 is operated between closed and open positions in response to respective placement and removal of the pan 62 with respect to the housing 61; and it is contemplated that the pan switch 110 will also be arranged in series relation with the other elements named in the control circuit for the electric motor 44, whereby the pan 62 must be arranged within the housing 61 in order to effect operation of the electric motor 44; the cooperation between the pan switch 110 and the pan 62 being substantially the same as the cooperation between the door switch 46 and the front door 23. In this modified form of the electric circuit, a section 111 of the normal wiring is removed to accommodate the series insertion of the pan switch 110 into the circuit; which section 111 may take the form of a shunting strap normally arranged between a pair of cooperating terminals 112; whereby the strap 111 is removed from between the terminals 112, and the pan switch 110, when employed, is connected therebetween. This arrangement insures that there is no useless operation of the unit 41 in the event of removal of the pan 62 from the housing 61 followed by reclosing of the front door 23; which situation may occur when the housewife wishes to wash the pan 62, or otherwise to employ it so that it is not immediately returned within the housing 61.

Also in conjunction with placement and removal of the pan 62 with respect to the housing 61, it is pointed out that the handle member 93 carried by the front wall 88 of the pan 62 is disposed within the doorway in an interfering position with the front door 23, when the pan 62 occupies its supported position within the housing 61 and when the handle member 93 is in its open position. Thus after placement of the pan 62 within the housing 61, it is necessary to operate the handle member 93 from its open position of Fig. 4 into its closed position of Fig. 5 in order to remove the handle member 93 from the doorway and out of interfering relation with the front door 23, so as to permit closure of the front door 23 with respect to the front opening into the storage compartment 22. This arrangement insures that the cover 65 occupies its closed position with respect to the boundary flange 91 of the pan 62 and that the valve element 104 occupies its closed position with respect to the vent port 103 following placement of the pan 62 within the housing 61, and before closure of the front door 23 is possible; thereby eliminating the possibility of useless operation of the unit 41 when the interior of the pressure-controlled receptacle 33 is not sealed against the atmosphere.

In order to test the effectiveness of the present method in preserving fresh foods selected from the class including vegetables, fruits, berries, and the like, a number of test receptacles of the character of the pressure-controlled receptacle 33, described in conjunction with Figs. 1 to 5, inclusive, were produced; a number of conventional food storage receptacles of the character of the receptacle 31 were procured; and also, a number of identical refrigerators of the conventional household type were procured.

In this test, three of the test receptacles of the construction of the receptacle 33 were designated as: "reduced-pressure pan #1," "reduced-pressure pan #2" and "reduced-pressure pan #3"; four of the conventional food storage receptacles were designated as: "standard pan #1," "standard pan #2," "standard pan #3" and "standard pan #4"; and the three refrigerators were designated as: "refrigerator #1," "refrigerator #2" and "refrigerator #3." As previously indicated, each of the standard pans #1, etc., was of conventional construction and the pan element thereof had the dimensions: 11⅜" x 11⅜" x 5⅝" and the associated glass cover, together with the usual vent holes provided in the upper portions of the side walls of the pan element, accommodated limited circulation of the cool air between the interior of the pan element and the storage compartment in the refrigerator, in a conventional manner.

In the test, the reduced pressure pans and the standard pans were filled with representative samples of fresh food, in a manner explained more fully hereinafter, and were placed in the three refrigerators in the three particular arrangements respectively shown in Figs. 6 to 8, inclusive, so as to obtain entirely comparable results. Each of the three refrigerators was operated to maintain the temperature within the food storage compartment thereof within the narrow range 37° F. to 46° F.; and the test involving the three refrigerators was simultaneous. In this connection, it is noted that in the test the coils respectively disposed between the suction conduits and the respective covers of the respective reduced pressure pans were quite long and flexible permitting ready movement of the reduced pressure pans within the food storage compartments of the respective refrigerators; this explanation is offered at this point in order that the preferred construction of the pressure-controlled pan of Figs. 1 to 5, inclusive, may be readily correlated with respect to the three test patterns of the three reduced pressure pans, as shown in Figs. 6 to 8, inclusive.

Turning now to the matter of the selection of the fresh foods to be tested, it was decided that the entire class was adequately represented by the members: lettuce, celery, asparagus, strawberries and tomatoes; whereby the test was confined to these members. In the test it was necessary to establish a quality-grading system of the fresh foods indicative of the state of preservation thereof as time proceeded, and involving factors concerning appearance, amount of drying, extent of deterioration, and, in some cases, odor and flavor; whereby a grading system was evolved that proceeded from grade #5 to grade #1, with the following significance:

Grade #5—perfect—original condition.
Grade #4—good—all portions usable, but with some portion slightly below original condition.
Grade #3—fair—some portion unusable.
Grade #2—poor—some portion usable.
Grade #1—bad—no portion usable.

Thus, it is apparent that there is only a small range difference between grade #5 and grade #4, but that there is a considerable range difference between grade #4 and grade #3. Moreover, from a practical standpoint, it is apparent that the real object of the test was to determine the extension of the storage time interval of the fresh food that could be procured between grade #5 and grade #4, and that the matters of the time intervals involved betwen grade #4 and grade #3, etc., are only of scientific interest in that they verify the conclusion with reference to the extension of the satisfactory storage time interval betwen grade #5 and grade #4.

In the test, each of the reduced pressure pans #1 to #3, inclusive, and each of the standard pans #1 to #4, inclusive, was provided with a load of fresh food comprising:

(a) Lettuce—one head.
(b) Celery—three stalks.
(c) Asparagus—one bunch of about ten individual stalks.
(d) Strawberries—about ½ pint in a perforated paper cup.
(e) Tomatoes—3 (of average size, about 2½" in diameter).

The seven pans mentioned, after being loaded, were placed in the three refrigerators in accordance with the three patterns, as indicated in Figs. 6 to 8, inclusive, after the three respective refrigerators were at a temperature (within the range 36° F. to 45° F.) and the test proceeded 42 days. During the test period, each of the storage pans was opened three times each working day and the food contained therein was inspected and at selected intervals the foods were graded in the manner previously explained. For example, the lettuce was graded at the expiration of the intervals (in days): 10, 21 and 25. The intervals (in days) of some of the other foods were: asparagus—14, 21 and 28; tomatoes—10, 15 and 21; strawberries—6, 10 and 15. Specifically, the grading of the foods was progressive with respect to the different pans mentioned. For example: all of the #1 pans were graded and the contents discarded at the end of the first time interval; all of #2 pans were graded and the contents discarded at the end of the second time interval; etc. Throughout the test, the temperature within the storage compartment of each refrigerator was maintained by the operating cycle of the associated refrigerating machine within the range 40–44° F.; however, each time the front door of any refrigerator was opened, the temperature within the food storage compartment thereof rose to about 57° F., although the temperature within the food storage compartment therein was restored back into its normal range 40–44° F., within 15-minutes after reclosure of the front door thereof. Throughout the test, the temperatures within the reduced pressure pan #1, etc. and within the standard pan #1, etc. were maintained substantially constant at 42° F., the temperature within any pan rising only 1° F. upon removal and opening therefrom, and again falling back to the temperature of 42° F. within 45-minutes after reclosure and replacement thereof. In the test, the three refrigerators were empty except for the reduced pressure pan #1, etc. and the standard pan #1, etc. as indicated in Figs. 6 to 8, inclusive. Throughout the test, the pressure in each reduced pressure pan #1, etc., was maintained in the previously-mentioned range (0.88 to 0.95 atmosphere); whereby the pressure centered around a pressure of about 0.90 atmosphere; and the pressure in each pressure pan #1, etc., was cycled from end to end of this range about three or four times per hour by the associated pressure control arrangement, as previously described.

In the test, the pressure in the reduced pressure pan #1, etc., was actually measured based upon a mercury column, whereby the associated pressure-controlled switch was adjusted to open the circuit to the electric drive motor of the associated unit when the pressure fell to 3½" of mercury below atmospheric pressure and to close the circuit to the electric drive motor of the associated unit when the pressure rose to 1½" of mercury below atmospheric pressure, thereby maintaining a pressure within the reduced pressure pan having an average value of about 2½" of mercury below atmospheric pressure (about 0.90 atmosphere). Also, in the test, it was discovered that incident to opening and to reclosing any one of the reduced pressure pans the pressure therein was restored to the average value of about 0.9 atmosphere after only several minutes of operation of the associated unit.

At the conclusion of the test, the relative grade values of different foods were averaged and plotted against storage time in days, as indicated in the respective graphs of Figs. 9 to 13, inclusive. Specifically: in Fig. 9, the curves 201 and 202 indicate the average grade values of lettuce-storage respectively in the three-reduced pressure pans and in the four standard pans; in Fig. 10, the curves 211 and 212 indicate the average grade values of celery-storage respectively in the three reduced pressure pans and in the four standard pans; in Fig. 11, the curves 221 and 222 indicate the average grade values of asparagus-storage respectively in the three reduced pressure pans and in the four standard pans; in Fig. 12, the curves 231 and 232 indicate the average grade values of strawberry-storage respectively in the three reduced pressure pans and in the four standard pans; and in Fig. 13, the curves 241 and 242 indicate the average grade values of tomato-storage respectively in the three reduced pressure pans and in the four standard pans.

In these tests, the significant fact is the extension of the satisfactory time interval that is required for the fresh food to deteriorate from grade #5 (perfect) to grade #4 (good). Thus, from a comparison of the curves 201 and 202 in Fig. 9, it will be observed that the extension of the time interval mentioned in the satisfactory storage of lettuce was from 9.5 to 26.7 days or 181%. From a comparison of the curves 211 and 212 in Fig. 10, it will be observed that the extension of the time interval mentioned in the satisfactory storage of celery was from 6.5 to 10.2 days or 57%. From a comparison of the curves 221 and 222 in Fig. 11, it will be observed that the extension of the time interval mentioned in the satisfactory storage of asparagus was from 11.8 to 17.6 days or 49%. From a comparison of the curves 231 and 232 in Fig. 12, it will be observed that the extension of the time interval mentioned in the satisfactory storage of strawberries was from 5.2 to 9.0 days or 73%. From a comparison of the curves 241 and 242 in Fig. 13, it will be observed that the extension of the time interval mentioned in the satisfactory storage of tomatoes was from 11.0 to 18.5 days or 68%.

The important portion of the complete data are recapitulated in the table below:

Table

| Food Item | Grade transition | Standard pans, storage—days | Red. Pres. pans, storage—days | Improvement days | Improvement percent |
|---|---|---|---|---|---|
| Lettuce | 5 to 4 | 9.5 | 26.7 | 17.2 | 181 |
|  | 5 to 3.5 | 15.2 | 37.3 | 22.1 | 146 |
|  | 5 to 3 | 21.9 | 45.9 | 24.0 | 110 |
| Celery | 5 to 4 | 6.5 | 10.2 | 3.7 | 57 |
|  | 5 to 3.5 | 10.3 | 16.2 | 5.9 | 57 |
|  | 5 to 3 | 14.8 | 23.1 | 8.3 | 56 |
| Asparagus | 5 to 4 | 11.8 | 17.6 | 5.8 | 49 |
|  | 5 to 3.5 | 16.2 | 22.9 | 6.7 | 41 |
|  | 5 to 3 | 20.1 | 27.8 | 7.7 | 38 |
| Strawberries | 5 to 4 | 5.2 | 9.0 | 3.8 | 73 |
|  | 5 to 3.5 | 7.4 | 12.5 | 5.1 | 69 |
|  | 5 to 3 | 9.8 | 16.0 | 6.2 | 63 |
| Tomatoes | 5 to 4 | 11.0 | 18.5 | 7.5 | 68 |
|  | 5 to 3.5 | 15.7 | 22.5 | 6.8 | 43 |
|  | 5 to 3 | 21.0 | 26.1 | 5.1 | 24 |

In view of the above, it will be understood that the present method of preserving fresh foods of the class mentioned materially extends the safe storage time between grade #5 and grade #4 that is of fundamental importance to the housewife in the preservation of such foods in her household refrigerator.

In other substantially identical fresh food preservation tests, it was established that the utilization of reduced pressures in the reduced pressure receptacles substantially above the range of the foregoing tests was ineffective materially to increase the satisfactory storage time intervals of the fresh foods mentioned beyond those obtained in the standard storage receptacles; and likewise, in still other substantially identical fresh food preservation tests, it was established that the utilization of reduced pressures in the reduced pressure receptacles that were substantially below the range of the foregoing tests was ineffective materially to increase the satisfactory storage time intervals of the fresh foods mentioned beyond those obtained in the reduced pressure receptacles involved in the foregoing test, and was most objectionable in that the acceleration of the drying-out of the fresh foods actually accelerated the deterioration thereof between grade #5 and grade #4, since the grading system employed involved factors concerning appearance, amount of drying-out, etc. In other words, in the extension of the safe storage time intervals of such fresh foods in the reduced pressure receptacles, it is critical that the pressure range be maintained within the approximate range involved in the test described above (about 0.88 to about 0.95 atmosphere, centering about 0.90 atmosphere).

The exact mechanism of the extension of the satisfactory storage time interval of the fresh foods mentioned is not altogether understood, but it is suggested that the utilization of the particular pressure range described, in conjunction with refrigeration, is critical because the pressure range is sufficiently low to effect the very gentle evaporation of moisture from the surface of the fresh food, without effecting rapid drying-out of the fresh food. Now it is reasoned that this gentle evaporation of the moisture from the surface of the fresh food upsets the conditions of the medium that are ideal to rapid growth of bacteria responsible for decay, of saprophytic fungi responsible for mold, and of other agents responsible for other aspects of deterioration of such fresh foods. Following this subject somewhat further, unquestionably the medium most conducive to rapid growth of bacteteria responsible for decay involves a composition having a higher moisture content than that which prevails upon the surface of the fresh foods when they are stored in the reduced pressure receptacle at a pressure within the discovered range, whereby the medium for the rapid rate of development of the culture is far from ideal, since it is really much too dry, as a result of the evaporation brought about by the reduced pressures. However, the reduction in the pressure is not so great as substantially to accelerate drying-out of the desired natural moisture contained in the fresh foods, whereby the safe storage time intervals of the fresh foods are greatly extended in the critical pressure range described, when employed in conjunction with the usual refrigerating effect prevailing in the food storage compartment of a conventional household refrigerator (the approximate temperature range 35° F. to 50° F.).

In view of the foregoing, it is apparent that there has been provided an improved method of preserving fresh foods of the class including vegetables, fruits and berries; which method is generally applicable to a wide variety of refrigerator apparatus including not only household refrigerators, but also industrial cold storage equipment.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of preserving a fresh food selected from the class consisting of vegetables, fruits and berries, comprising storing the fresh food in a closed receptacle, subjecting the fresh food stored in said closed receptacle to refrigeration at a temperature within the approximate range 35° F. to 50° F., and simultaneously subjecting the fresh food stored in said closed receptacle to successive pressure cycles in the subatmospheric pressure range and extending between a relatively low pressure disposed only somewhat below 0.9 atmosphere and a relatively high pressure disposed only somewhat above 0.9 atmosphere while continuously admitting fresh air into said closed receptacle at an established low rate, wherein each of said pressure cycles includes a falling pressure phase that is produced by pumping air from said closed receptacle at an established high rate and overriding said admission of the fresh air into said closed receptacle at the established low rate and a complementary rising pressure phase that is produced substantially entirely by said admission of the fresh air into said closed receptacle at the established low rate, wherein said pumping of air from said closed receptacle in the falling pressure phase of each of said pressure cycles is initiated in response to the relatively high pressure in said closed receptacle and is terminated in response to the relatively low pressure in said closed receptacle, and wherein the established high rate of said air pumping and the established low rate of said air admission are so correlated that several of said pressure cycles are effected each hour and so that in each of said pressure cycles the time interval of the falling pressure phase thereof is substantially shorter than the time interval of the rising pressure phase thereof.

2. The method of preserving a fresh food selected from the class consisting of vegetables, fruits and berries, comprising storing the fresh food in a closed receptacle, subjecting the fresh food stored in said closed receptacle to refrigeration at a temperature within the approximate range 35° F. to 50° F., and simultaneously subjecting the fresh food stored in said closed receptacle to successive pressure cycles within the approximate range 0.88 to 0.95 atmosphere while continuously admitting fresh air into said closed receptacle at an established low rate, wherein each of said pressure cycles includes a falling pressure phase that is produced by pumping air from said closed receptacle at an established high rate and overriding said admission of the fresh air into said closed receptacle at the established low rate and a complementary rising pressure phase that is produced substantially entirely by said admission of the fresh air into said closed receptacle at the established low rate, wherein said pumping of air from said closed receptacle in the falling pressure phase of each of said pressure cycles is initiated in response to a pressure in said closed receptacle of about 0.95 atmosphere and is terminated in response to a pressure in said closed receptacle of about 0.88 atmosphere, and wherein the established high rate of said air pumping and the established low rate of said air admission are so correlated that several of said pressure cycles are effected each hour and so that in each of said pressure cycles the time interval of the falling pressure phase thereof is substantially shorter than the time interval of the rising pressure phase thereof.

3. The method set forth in claim 2, wherein each of said pressure cycles is effected in a total time interval of approximately 15 to 20 minutes and the time interval of the falling pressure phase thereof is only a few minutes.

4. The method set forth in claim 2, wherein said correlation of the established high rate of said air pumping and the established low rate of said air admission are such that the pressure in said closed container may be reduced from 1.0 atmosphere to about 0.9 atmosphere in an overall time interval of only several minutes.

References Cited in the file of this patent

UNITED STATES PATENTS

| | | |
|---|---|---|
| 2,109,002 | Warren | Feb. 22, 1938 |
| 2,116,813 | Weisser | May 10, 1938 |
| 2,156,201 | Snipes | Apr. 25, 1939 |
| 2,280,827 | Hoveman | Apr. 28, 1942 |
| 2,419,877 | Birdseye | Apr. 29, 1947 |

FOREIGN PATENTS

| | | |
|---|---|---|
| 30,651 | Australia | Mar. 17, 1932 |